United States Patent
Hebrard

(10) Patent No.: US 8,807,314 B2
(45) Date of Patent: Aug. 19, 2014

(54) CLUTCH ACTUATOR CONTROLLED BY A PRESSURE MEDIUM FOR A COMPRESSOR CLUTCH OF A COMMERCIAL VEHICLE

(75) Inventor: Gilles Hebrard, Caen (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 37 days.

(21) Appl. No.: 13/469,730

(22) Filed: May 11, 2012

(65) Prior Publication Data

US 2012/0279822 A1  Nov. 8, 2012

Related U.S. Application Data

(63) Continuation of application No. PCT/EP2010/067105, filed on Nov. 9, 2010.

(30) Foreign Application Priority Data

Nov. 11, 2009  (DE) .......... 10 2009 052 789

(51) Int. Cl.
*F16D 25/04* (2006.01)

(52) U.S. Cl.
USPC ................ 192/85.15; 192/85.03

(58) Field of Classification Search
USPC .......... 192/85.15, 85.03, 85.04, 85.05, 85.11, 192/85.14
See application file for complete search history.

(56) References Cited

U.S. PATENT DOCUMENTS

| 3,004,559 | A | * | 10/1961 | Warman, Jr. ................ 92/92 |
| 3,053,235 | A | * | 9/1962 | Hager ................ 92/99 |
| 3,106,873 | A | * | 10/1963 | Cripe ................ 91/369.2 |
| 3,189,151 | A |   | 6/1965 | Sullivan |
| 4,524,855 | A |   | 6/1985 | Brandenstein |
| 4,586,427 | A | * | 5/1986 | Thiel ................ 91/369.2 |
| 4,606,449 | A | * | 8/1986 | Lederman ................ 192/85.15 |
| 4,637,505 | A | * | 1/1987 | Huber ................ 192/85.15 |
| 4,708,229 | A |   | 11/1987 | Anderson et al. |
| 5,249,508 | A | * | 10/1993 | Hasegawa et al. ................ 92/93 |
| 6,347,695 | B1 |  | 2/2002 | Kuhn et al. |
| 6,578,691 | B1 | * | 6/2003 | Ashbrook ................ 192/85.15 |

FOREIGN PATENT DOCUMENTS

| DE | 1 224 573 B | 9/1966 |
| DE | 1 555 538 A1 | 7/1970 |
| DE | 31 33 968 A1 | 3/1983 |
| DE | 10 2008 043 486 A1 | 4/2010 |
| EP | 0 038 370 A1 | 10/1981 |
| GB | 2 116 282 A | 9/1983 |
| JP | 5-3732 U | 1/1993 |
| JP | 2000-320574 A | 11/2000 |

OTHER PUBLICATIONS

International Preliminary Report on Patentability dated May 24, 2012 (ten (10) pages).

(Continued)

*Primary Examiner* — Rodney Bonck
(74) *Attorney, Agent, or Firm* — Crowell & Moring LLP

(57) ABSTRACT

A clutch actuator controlled by a pressure medium, in particular for a compressor clutch of a commercial vehicle has an actuating piston displaceably disposed in a housing in an axial direction. An end of the actuating piston is supported in the axial direction on an elastic membrane, sealing a first region of the housing off from a second region of the housing. The elastic membrane includes a raised area on the side opposite the actuating piston. The clutch actuator can be used in a compressor clutch for a commercial vehicle.

16 Claims, 4 Drawing Sheets

(56) References Cited

OTHER PUBLICATIONS

German Office Action dated Apr. 7, 2010 with English translation (twelve (12) pages).

International Search Report dated Feb. 1, 2011 with English translation (six (6) pages).

Machine English translation of Japanese Office Action dated May 19, 2014 {Three (3) pages}.

* cited by examiner

Fig. 1 (State of the art)

CLUTCH ACTUATOR CONTROLLED BY A PRESSURE MEDIUM FOR A COMPRESSOR CLUTCH OF A COMMERCIAL VEHICLE

CROSS-REFERENCE TO RELATED APPLICATIONS

This application is a continuation of PCT International Application No. PCT/EP2010/067105, filed Nov. 9, 2010, which claims priority under 35 U.S.C. §119 from German Patent Application No. DE 10 2009 052 052789.3, filed Nov. 11, 2009, the entire disclosures of which are herein expressly incorporated by reference.

BACKGROUND AND SUMMARY OF THE INVENTION

The invention relates to a pressure medium-controlled clutch actuator, having an actuating piston, which is arranged so that it can move in an axial direction in a housing, wherein one end of the actuating piston is supported in an axial direction on an elastic diaphragm. The elastic diaphragm seals off a first area of the housing from a second area of the housing.

The invention further relates to a compressor clutch for a commercial vehicle, having a clutch actuator according to the invention.

Besides a power unit used for driving the vehicle, vehicles, particularly commercial vehicles, nowadays have a large number of auxiliary units assigned to the power unit, which are also driven by the power unit. These auxiliary units are often necessary for the operation of the vehicle, provision having to be made for operating some of the various auxiliary units continuously, and some in phases. Thus, for example, an injection pump, which delivers pressurized fuel to the power unit, must run continuously during the operation of the power unit. A pneumatic compressor, however, as may be provided in commercial vehicles for supplying pressure medium-operated service and parking brakes, may be temporarily shut down, provided that a reserve of compressed air sufficient for actuation of the brake system is available within the vehicle. The compressor may be shut down, for example, by use of a clutch, which is arranged between the power unit and the pneumatic compressor. A clutch derived from the state of the art is represented by way of example in FIG. 1.

FIG. 1 shows a clutch according to the state of the art. A compressor clutch 12 shown, which couples together friction disks (not visible) arranged in an axial direction 18 inside a housing 16, includes, in particular, a clutch actuator 10, which is responsible for the movement of the friction disks in an axial direction 18 during the operation of the compressor clutch 12. The clutch actuator 10 is pressure medium-operated, compressed air as a pressure medium, for example, being introduced into a pressure chamber having a spring 44. An actuating piston 14 is moveable in the axial direction 18 inside the housing 16, sealing webs 32, 34 sealing off the pressure chamber during the movement of the actuating piston 14. The actuating piston 14 is guided in an axial direction 18 by a bearing 42, which prevents a rotation of the actuating piston 14 during the operation of the clutch actuator 10. Also provided is a spring 44, which biases the actuating piston 14 in the axial direction 18, in order to spare the bearing 42. The spring 44 is situated in the volumes ventilated during the operation of the clutch actuator 10. The sealing rings 32, 34 may be fitted to the actuating piston 14, for example, or they may be produced directly on the actuating piston 14, a thin film of oil between the sealing webs 32, 34 and the housing 16 usually ensuring ease of movement of the actuating piston 14 with the sealing webs 32, 34 in the axial direction 18. The tightness of the ventilated volume is therefore ultimately ensured by the film of oil on the housing wall, which compensates for even the smallest irregularities. By virtue of the design, therefore, oil used as lubricant may be absorbed by the pressure medium used for operating the clutch actuator 10, and on renewed operation of the clutch actuator 10, that is to say particularly when pressure is released from the pressure chamber, can escape into the environment. This is detrimental from ecological standpoints and pollutes the environment unnecessarily, since oil expelled uncontrolledly is not readily degradable and exercises a toxic effect on many organisms.

U.S. Pat. No. 4,708,229 A discloses a known clutch actuator.

The object of the present invention, therefore, is to provide a clutch actuator for a compressor clutch, which has improved operating characteristics.

This and other objects are achieved by providing a pressure medium-controlled clutch actuator having an actuating piston which is arranged so that it can move in an axial direction in a housing. One end of the actuating piston is supported in an axial direction on an elastic diaphragm, which seals off a first area of the housing from a second area of the housing. The elastic diaphragm includes a projection on the side facing the actuating piston.

The clutch actuator according to the invention thus improves upon the state of the art in that the elastic diaphragm comprises a projection on the side facing the actuating piston. Interacting with the housing, a material reinforcement of the diaphragm in the form of a projection on the side facing the actuating piston serves to generate a force biasing the actuating piston, so that this is always situated in a defined axial position. Furthermore, the operating travel in an axial direction that has to be covered for operation of the clutch is reduced and the service life of the axial bearing of the actuating piston is increased. Since the end of the actuating piston can be supported on the diaphragm, a contact between the pressure medium and an oil used as lubricant is prevented. An uncontrolled emission of oil together with the pressure medium used is therefore reliably prevented.

The elastic diaphragm may usefully form a bellows, which is arranged at least partially inside the housing. The diaphragm itself can in this way provide a complete pressure chamber, for example in the form of a cushion or a torus, a change of pressure inside the bellows displacing the actuating piston in the axial direction through the expansion or through the collapsing of the bellows.

The elastic diaphragm may advantageously have at least one edge which is fixed in relation to the housing. Alternatively, a diaphragm, which already forms a complete bellows or which subdivides a volume inside the housing into two areas separated from one another, in order to form a bellows, may here be fixed inside the housing. Owing to the elasticity of the diaphragm, in the second case the partition wall formed is deformable and in the event of a pressure increase is capable of moving the actuating piston supported on the diaphragm in an axial direction. In the first case only the position of the bellows is defined by fixing the edge in the housing.

Here at least the one edge of the elastic diaphragm may advantageously be formed by a sealing web. Forming the edge of the diaphragm as a sealing web facilitates assembly and increases the stability of the clutch actuator.

More preferably still, the elastic diaphragm may be fabric-reinforced. This serves to increase the durability of the diaphragm and thereby of the clutch actuator as a whole.

Furthermore, the elastic diaphragm in the support area of the actuating piston may include an indentation, into which the end of the actuating piston projects. In this way the actuating piston can be supported virtually on the surface of the diaphragm, so that further guiding of the actuating piston in an axial direction may be dispensed with.

The elastic diaphragm may usefully also be of substantially circular shape. In particular, this allows force to be transmitted to the actuating piston without interference from radial components.

The actuating piston may usefully also be embodied as a hollow piston, through which a shaft of the compressor clutch is passed, and the elastic diaphragm may have an opening for the passage of the shaft. This affords an especially compact design form of the compressor clutch.

In particular here, the opening for the passage of the shaft may be of circular shape.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
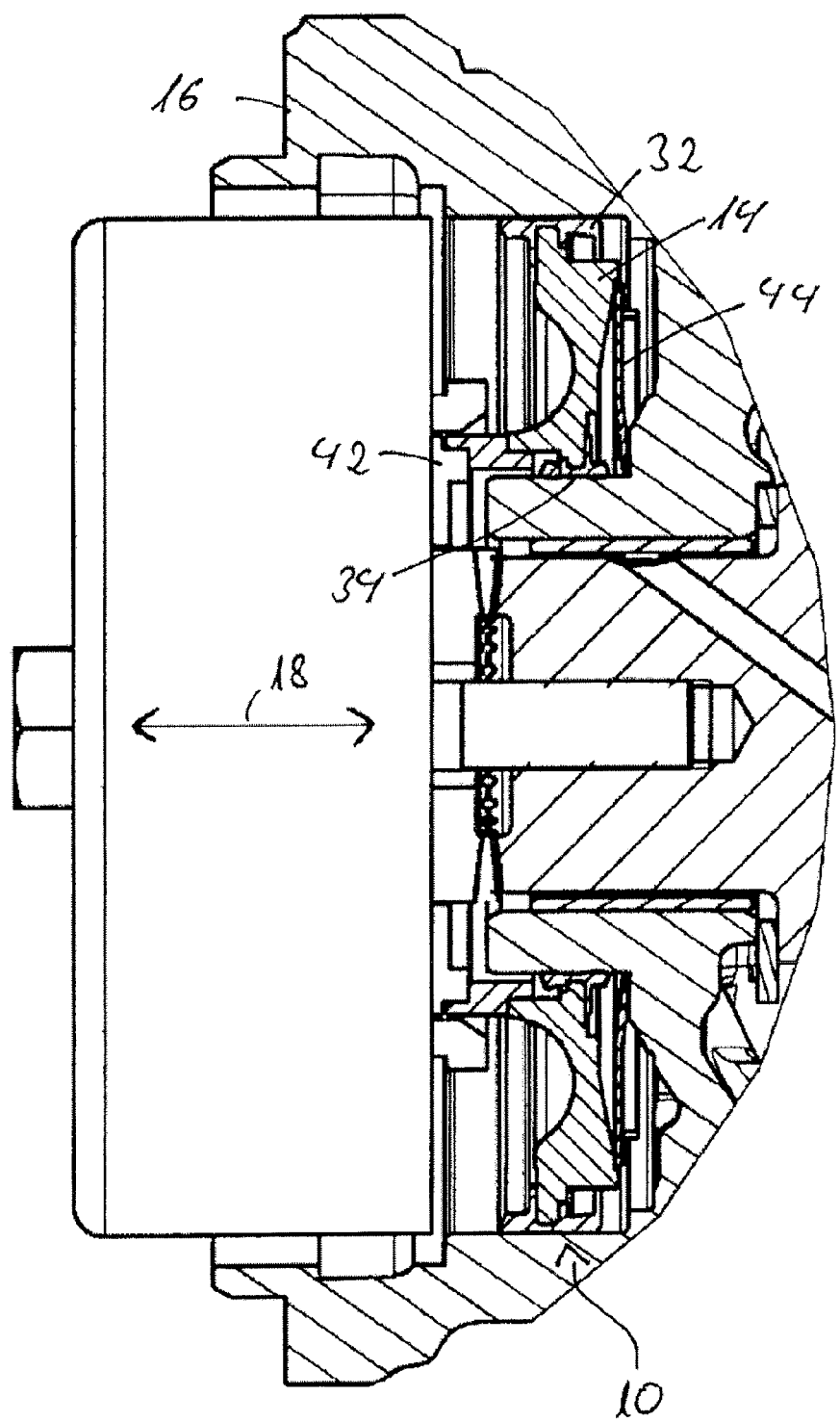
FIG. 1 shows a compressor clutch according to the state of the art.

In the following drawings the same reference numerals denote the same or similar parts.

FIG. 1 shows a compressor clutch according to the state of the art and has already been described.

Figure 2:
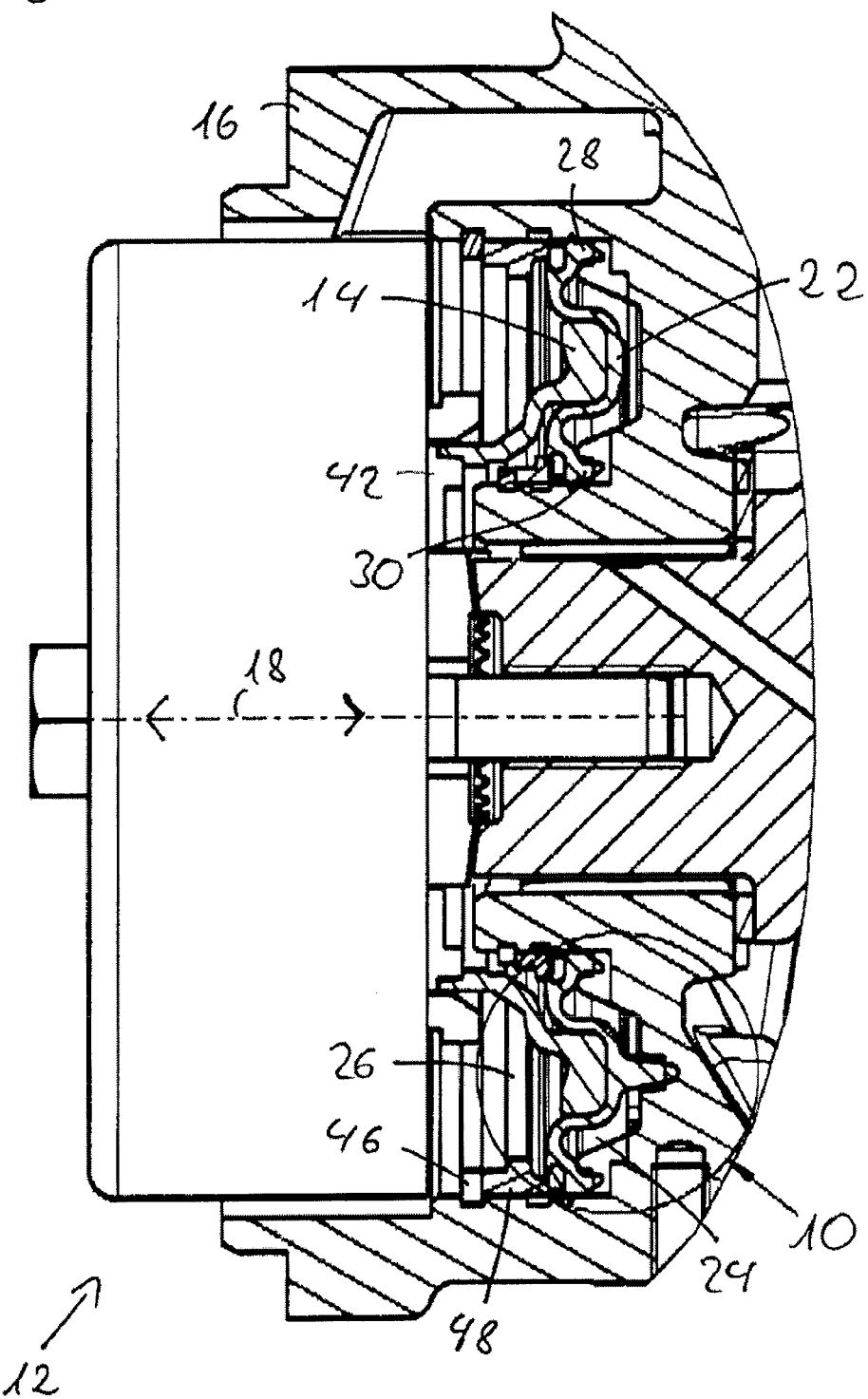
FIG. 2 shows a compressor clutch according to an embodiment of the invention.

FIG. 2 shows a compressor clutch according to a preferred embodiment of the invention. In contrast to the compressor clutch 12 disclosed in FIG. 1, the compressor clutch 12 represented in FIG. 2 comprises an elastic diaphragm 22, which is fixed via edges 28, 30 in relation to the housing 16, and at the same time subdivides a volume inside the housing 16, in which the actuating piston 14 is able to move in the axial direction 18, into a first area 24 and a second area 26. The actuating piston 14 is separated from the first area 24 by the elastic diaphragm 22. The edges 28, 30 of the elastic diaphragm 22 are fixed in relation to the housing 16 by way of a spring ring 46 and a washer 48. A bearing 42 is furthermore provided, which supports the actuating piston 14 in the axial direction 18 in relation to the housing 16.

For operating the compressor clutch 12 shown, pressure medium is fed to the clutch actuator 10 into the first area 24. Due to the resulting increase in pressure, the elastic diaphragm 22 is deformed in such a way that the actuating piston 14 is displaced in the axial direction 18. In the process the compressor clutch 12 shown is operated, for example opened.

When assembling the compressor clutch 10, the elastic diaphragm 22 is first placed in the housing 16. Then, using the washer 48, the elastic diaphragm 22 is fixed by use of the spring ring 46, which acts as retaining ring. Finally, the actuating piston 14 can be introduced into the housing 14. When fitting the actuating piston 14, a projection, which is described in connection with FIG. 4 and which assumes the function of the spring 44 in FIG. 1, is pressed against the housing 16. Incorrect fitting of the spring 44 is therefore reliably precluded.

Figure 3:
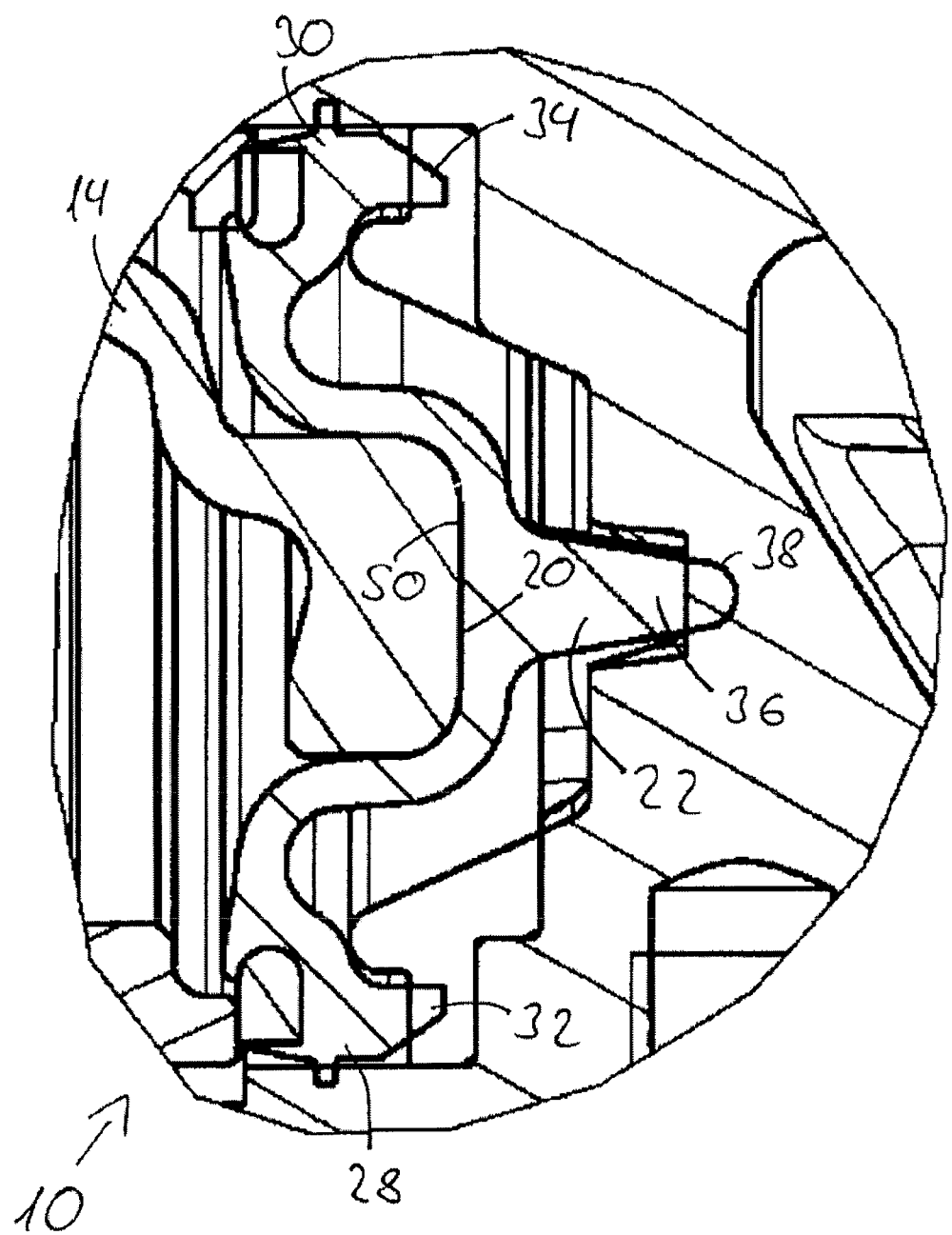
FIG. 3 shows a detail view of a clutch actuator according to an embodiment of the invention.

FIG. 3 shows a detail view of a clutch actuator. Sealing webs 32, 34 are clearly visible at the edges 28 and 30 respectively of the elastic diaphragm 22. Also visible is a raised area 36 on a side of the elastic diaphragm 22 remote from one end 20 of the actuating piston 14. The raised area 36, in the operating position of the clutch actuator 10 represented, rests in an assigned depression 38 of the housing 16. In the operating position of the compressor clutch 12 represented, the raised area 36, in conjunction with depression 38, is able to achieve a biasing of the actuating piston 14, in order to exert a positive influence on the service life of the bearing 42 disclosed in FIG. 2. Furthermore, the elastic diaphragm 22 has an indentation 50, in which the end 20 of the actuating piston 14 is received. This may serve to relieve and to spare the bearing 42.

Figure 4:
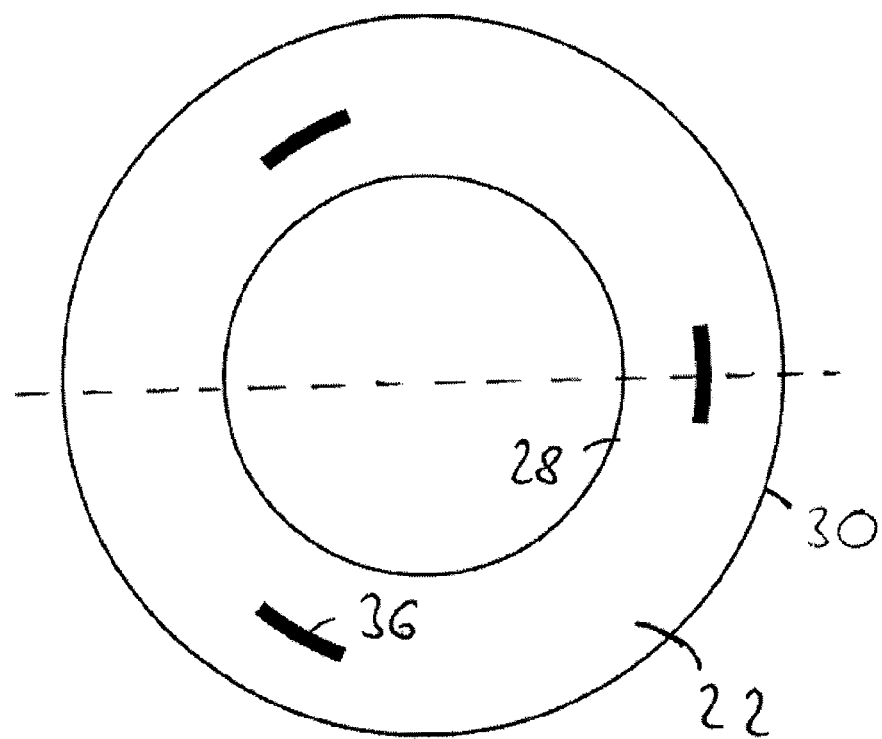
FIG. 4 shows a top view of an elastic diaphragm.

FIG. 4 shows a top view of an elastic diaphragm. The elastic diaphragm 22 represented has an inner edge 28 and an outer edge 30 and is of circular shape. Also shown is the raised area 36, already disclosed in FIG. 3. The raised area 36 may run all the way round, or it may be built up from multiple separate projections raised areas 36, as shown in FIG. 4. Here the number of raised areas 36 may vary. The inner edge 28 of the elastic diaphragm 22 defines a circular opening, through which, for example, a shaft can be passed. In this way the compressor clutch can be of especially compact construction. The elastic diaphragm 22 may, in particular, include a fabric, which affords a particularly mechanical reinforcement of the structure of the elastic diaphragm 22 and increases its service life. The elastic diaphragm 22 may therefore be perceived as a composite component, particularly if additional sealing webs 32, 34, which may be composed of another material, are attached to the edges 28, 30.

Figure 5:
FIG. 5 shows a sectional side view of an elastic diaphragm.

FIG. 5 shows a sectional side view of an elastic diaphragm. The elastic diaphragm 22 is represented along the section line visible in FIG. 4. Both the indentation 50 for receiving the end 20 of the actuating piston 14 and the raised area 36 on the side of the elastic diaphragm 22 remote from the indentation 50, which serve to produce a biasing of the actuating piston, are clearly visible.

LIST OF REFERENCE NUMERALS 10 clutch actuator
12 compressor clutch
14 actuating piston
16 housing
18 axial direction
20 end
22 elastic diaphragm
24 first area
26 second area
28 edge
30 edge
32 sealing web
34 sealing web
36 raised area
38 depression
42 bearing
44 spring
46 spring ring
48 washer
50 indentation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure medium-controlled clutch actuator, comprising:
    a housing;
    an actuating piston arrangeable to move in an axial direction in the housing;
    an elastic diaphragm having a rim, the elastic diaphragm supporting one end of the actuating piston in the axial direction, the elastic diaphragm sealing-off a first area of the housing from a second area of the-housing, wherein
        the elastic diaphragm includes a raised area that extends in a direction away from the actuating piston distant from the rim;
        the raised area is formed by a region of the elastic diaphragm with increased thickness, as compared to a rest of the elastic diaphragm;
        said raised area rests in an assigned depression of the housing in one operating position of the clutch actuator such that the raised area completely fills the assigned depression; and
        said raised area in conjunction with said assigned depression of the housing achieve a biasing of the actuating piston in the axial direction when the clutch actuator is in said one operating position.

2. The clutch actuator according to claim 1, wherein the elastic diaphragm forms a bellows, which is arranged at least partially inside the housing.

3. The clutch actuator according to claim 2, wherein the elastic diaphragm has at least one edge, which is fixed in relation to the housing.

4. The clutch actuator according to claim 3, wherein at least the one edge of the elastic diaphragm is formed by a sealing web.

5. The clutch actuator according to claim 1, wherein the elastic diaphragm has at least one edge, which is fixed in relation to the housing.

6. The clutch actuator according to claim 5, wherein at least the one edge of the elastic diaphragm is formed by a sealing web.

7. The clutch actuator according to claim 1, wherein the elastic diaphragm is fabric-reinforced.

8. The clutch actuator according to claim 1, wherein the elastic diaphragm in a support area of the actuating piston comprises an indentation, into which the one end of the actuating piston projects.

9. The clutch actuator according to claim 1, wherein the elastic diaphragm is of substantially circular shape.

10. The clutch actuator according to claim 1, wherein:
    the actuating piston is a hollow piston, through which a shaft is passed; and
    the elastic diaphragm has an opening for passage of the shaft.

11. The clutch actuator according to claim 10, wherein the opening for the passage of the shaft is of a circular shape.

12. The clutch actuator according to claim 1, wherein a radial thickness of the raised area decreases, from a portion of the elastic diaphragm proximate to the actuating piston, toward the assigned depression of the housing.

13. The clutch actuator according to claim 1, wherein the elastic diaphragm is symmetrical about an imaginary line through the raised area in the axial direction.

14. A compressor clutch for a commercial vehicle, comprising:
    a pressure medium-controlled clutch actuator, the clutch actuator comprising:
        a housing;
        an actuating piston arrangeable to move in an axial direction in the housing;
        an elastic diaphragm having a rim, the elastic diaphragm supporting one end of the actuating piston in the axial direction, the elastic diaphragm sealing-off a first area of the housing from a second area of the housing; wherein
            the elastic diaphragm includes a raised area that extends in a direction away from the actuating piston distant from the rim;
            the raised area is formed by a region of the elastic diaphragm with
            increased thickness, as compared to a rest of the elastic diaphragm;
            said raised area rests in an assigned depression of the housing in one operating position of the clutch actuator such that the raised area completely fills the assigned depression; and
            said raised area in conjunction with said assigned depression of the housing achieve a biasing of the actuating piston in the axial direction when the clutch actuator is in said one operating position.

15. The compressor clutch for a commercial vehicle according to claim 14, wherein a radial thickness of the raised area decreases, from a portion of the elastic diaphragm proximate to the actuating piston, toward the assigned depression of the housing.

16. The compressor clutch for a commercial vehicle according to claim 14, wherein the elastic diaphragm is symmetrical about an imaginary line through the raised area in the axial direction.

* * * * *